United States Patent

Underkofler et al.

(10) Patent No.: US 6,621,656 B2
(45) Date of Patent: Sep. 16, 2003

(54) MOVEABLE TAPE GUIDE CLEANING MEMBER

(75) Inventors: Daniel W. Underkofler, Lafayette, CO (US); Phillip M. Morgan, Berthoud, CO (US)

(73) Assignee: Storage Technology Corporation, Louisville, CO (US)

( * ) Notice: Subject to any disclaimer, the term of this patent is extended or adjusted under 35 U.S.C. 154(b) by 269 days.

(21) Appl. No.: 09/826,193

(22) Filed: Apr. 5, 2001

(65) Prior Publication Data

US 2002/0145820 A1 Oct. 10, 2002

(51) Int. Cl.⁷ .............................................. G11B 15/67
(52) U.S. Cl. ........................ 360/95; 360/128; 242/332.8
(58) Field of Search .......................... 360/85, 95, 128; 242/332, 332.8, 348, 348.3

(56) References Cited

U.S. PATENT DOCUMENTS

| | | | | |
|---|---|---|---|---|
| 5,155,639 A | * | 10/1992 | Platter et al. ................. | 360/95 |
| 6,021,026 A | | 2/2000 | Dallago ...................... | 360/128 |
| 6,038,111 A | | 3/2000 | Thiessen et al. ............. | 360/128 |
| 6,067,211 A | * | 5/2000 | Chliwnyj et al. ............ | 360/128 |
| 6,067,212 A | * | 5/2000 | Poorman ..................... | 360/128 |
| 6,166,881 A | * | 12/2000 | Anderson et al. ........... | 360/128 |
| 6,208,488 B1 | * | 3/2001 | Yamakawa et al. ......... | 360/128 |
| 6,215,618 B1 | * | 4/2001 | Anderson et al. ........... | 360/128 |
| 6,359,751 B1 | * | 3/2002 | Groel et al. ................. | 360/128 |
| 6,497,377 B2 | * | 12/2002 | Underkofler et al. ..... | 242/332.8 |
| 2002/0048118 A1 | * | 4/2002 | Tanaka et al. ............... | 360/128 |
| 2002/0181145 A1 | * | 12/2002 | Tsuchiya ...................... | 360/95 |

FOREIGN PATENT DOCUMENTS

JP              62-125565 A    *  6/1987

* cited by examiner

*Primary Examiner*—Jefferson Evans
(74) *Attorney, Agent, or Firm*—Brooks & Kushman P.C.

(57) ABSTRACT

A tape drive includes a drive body and a tape guide supported by the drive body. The tape drive further includes a threading mechanism having a first member pivotally associated with the drive body, and a cleaning member supported by the first member and moveable therewith. The cleaning member is engageable with the tape guide so as to clean the tape guide.

13 Claims, 3 Drawing Sheets

MOVEABLE TAPE GUIDE CLEANING MEMBER

BACKGROUND OF THE INVENTION

1. Field of the Invention

The invention relates to a cleaning member for cleaning tape path guides of a tape drive.

2. Background Art

Magnetic tape is frequently used to store digital data thereon. Such tape may be housed in a tape cartridge that protects the tape from damage. A leader block attached to a free end of the tape is used to withdraw the tape from the cartridge for read/write operations.

Read/write operations are performed by a tape transport or tape drive that is configured to receive the cartridge. The tape drive includes a threading mechanism that grabs the leader block and pulls it free from the cartridge. The threading mechanism then routes the leader block along a guide channel and into a slot in a take-up reel of the tape drive so as to load the tape in the tape drive. The tape drive also includes a plurality of guide bearings that function to guide the tape across a longitudinal read/write head for data transfer operations, as the tape is driven through the tape drive and onto a hub of the take-up reel.

As the tape moves over the guide bearings, tape wear may occur, thereby generating tape debris. This debris may build up on the guide bearings, which may cause track following and read/write problems. Some debris may also end up between layers of tape as the tape is wound on the take-up reel.

A prior method of cleaning tape drives includes using a cleaning cartridge having a tape with an abrasive media. The tape is fed through the tape drive so as to remove or dislodge debris. Other methods include using moveable brushes to clean read/write heads, and manually disassembling and cleaning tape drives. These methods, however, do not provide for efficient and effective cleaning of guide bearings.

SUMMARY OF THE INVENTION

The present invention addresses the shortcomings of the prior art by providing a tape drive including a cleaning member that efficiently and effectively cleans debris from tape guides such as guide bearings.

A tape drive according to the invention includes a drive body and a tape guide supported by the drive body. The tape drive further includes a threading mechanism having a first member pivotally associated with the drive body, and a cleaning member supported by the first member and moveable therewith. The cleaning member is engageable with the tape guide so as to clean the tape guide.

In one embodiment of the invention, the cleaning member is a brush having a plurality of bristles, and the tape guide includes a guide body and a guide element adjacent the guide body. Furthermore, the guide element may have an angled surface for directing bristles between the guide body and the guide element. With such a configuration, debris accumulation between the guide body and the guide element can be effectively reduced.

The tape guide may include a guide body having a debris pocket for collecting debris. In the preferred embodiment, the guide body includes a guide surface and a top surface adjacent the guide surface, and the debris pocket is formed in the top surface. With such a configuration, debris accumulation between the guide body and the guide element can be further inhibited.

Further under the invention, a method is provided for cleaning a tape guide of a tape drive, wherein the tape drive has a threading mechanism for loading tape into the tape drive. The method includes the steps of providing a cleaning member on the threading mechanism; and moving the threading mechanism so as to move the cleaning member across the tape guide.

These and other objects, features and advantages of the invention are readily apparent from the following detailed description of the best modes for carrying out the invention when taken in conjunction with the accompanying drawings.

DETAILED DESCRIPTION OF THE PREFERRED EMBODIMENT(S)

Figure 1:
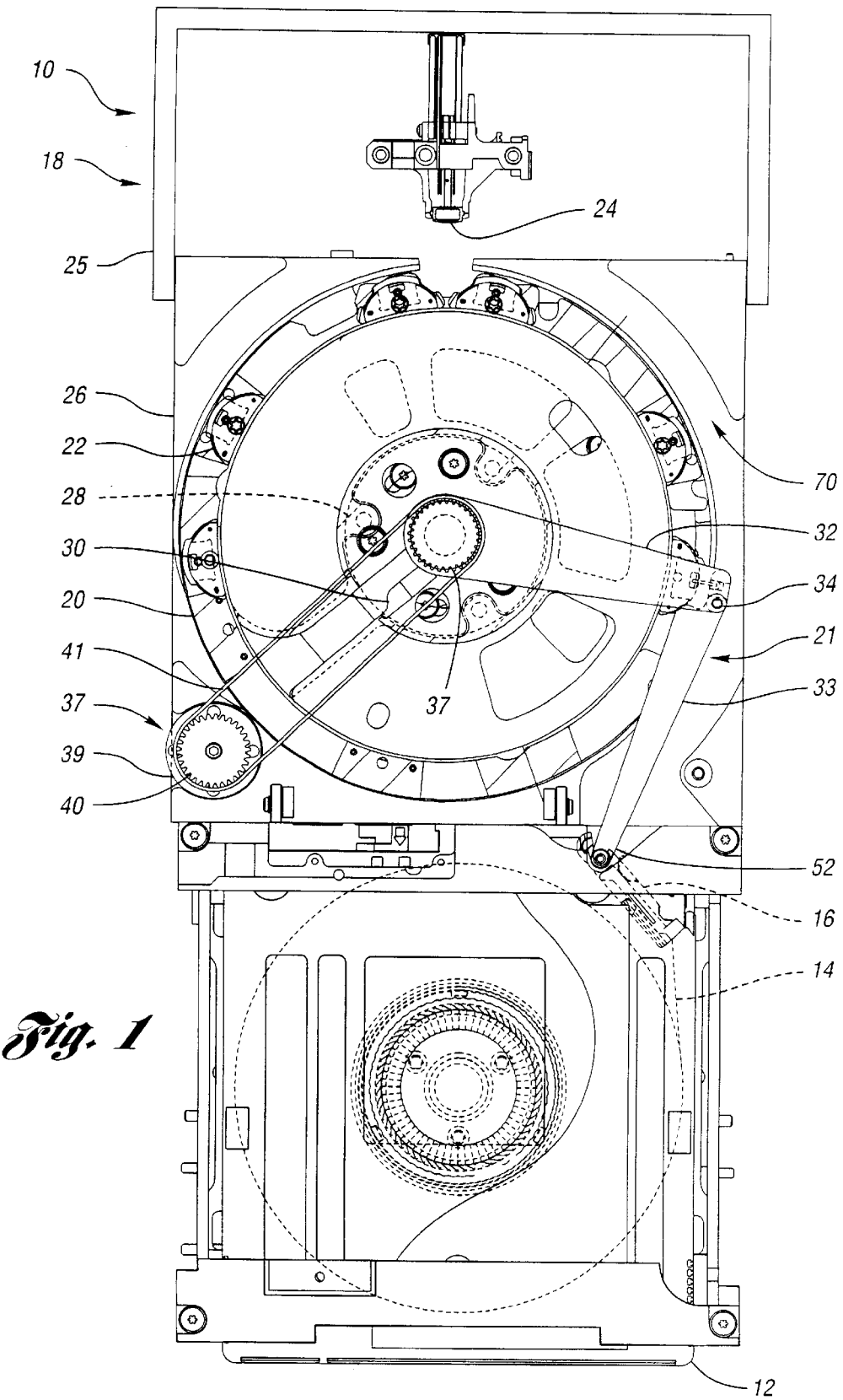
FIG. 1 is a simplified top view of a tape drive according to the invention for use with a tape cartridge having magnetic tape wound on a supply reel, wherein the tape drive includes a drive body, a rotatable take-up reel, a plurality of guide bearings supported by the drive body, and a moveable threading mechanism for loading the tape onto the take-up reel, the threading mechanism being shown in a tape-unloaded position and including a cleaning member for cleaning the guide bearings.

FIG. 1 shows a tape drive 10 according to the present invention for use with a tape cartridge 12 having magnetic recording tape 14 wound on a supply reel. As is known in the art, a first leader member such as leader block 16 may be attached to a free end of the tape 14. The tape drive 10 includes a drive body 18 that receives the tape cartridge 12, a take-up reel 20, a threading mechanism 21 moveably associated with the drive body 18 for loading the tape 14 onto the take-up reel 20, a plurality of tape guides such as guide bearings 22, and a read/write head 24 attached to the drive body 18 for performing read/write operations on the tape 14.

Figure 2:
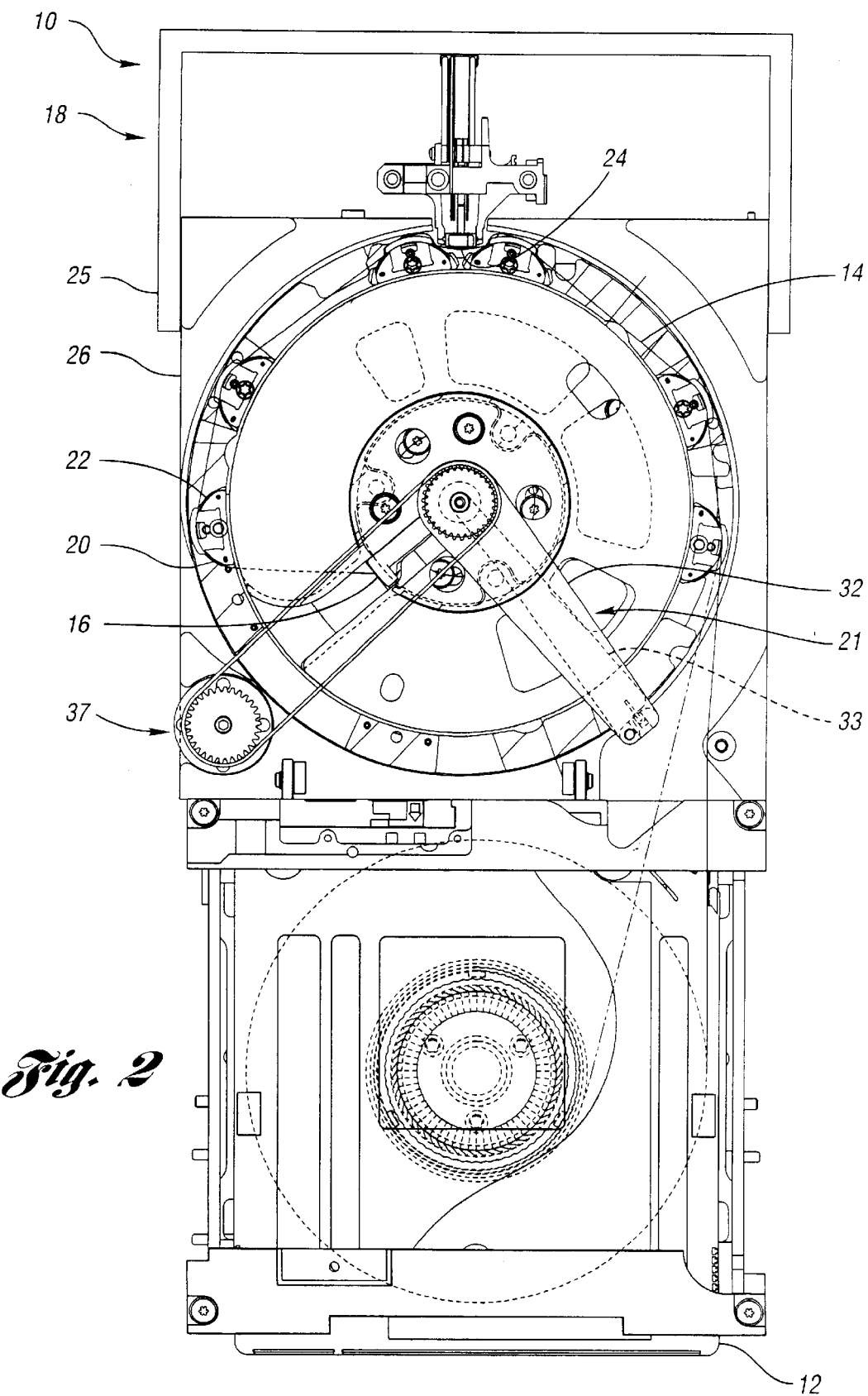
FIG. 2 is a top view of the tape drive showing the threading mechanism in a tape-loaded position.

Referring to FIGS. 1 and 2, the drive body 18 includes first and second portions 25 and 26, respectively. The second portion 26 is moveable with respect to the first portion between a first position shown in FIG. 1, and a second position shown in FIG. 2.

The take-up reel 20 is rotatably connected to, or otherwise supported by, the second portion 26. For example, the take-up reel 20 may be connected to a rotatable shaft of a first motor (not shown) that is positioned beneath the take-up reel 20. Furthermore, the take-up reel 20 has a hub 28 onto which the tape 14 may be wound, and the hub has a slot 30 for receiving the leader block 16.

Figure 3:
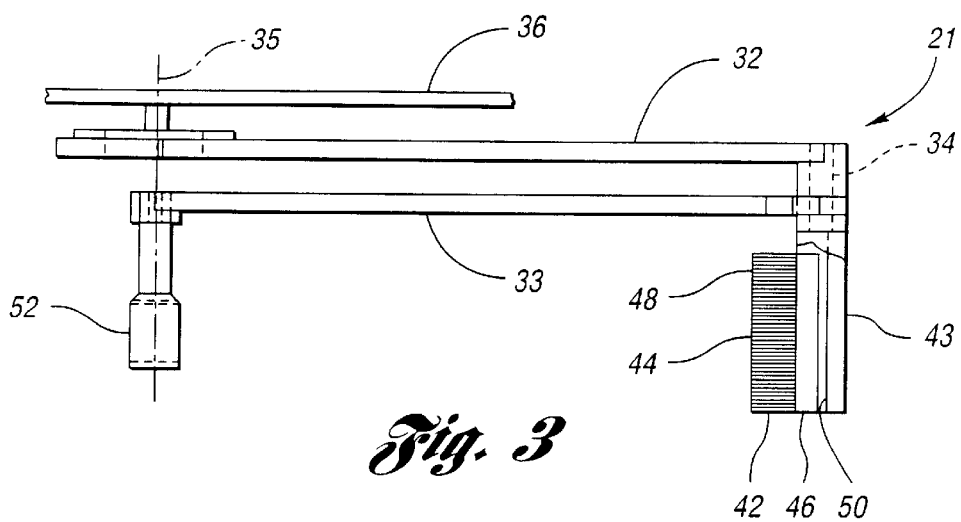
FIG. 3 is a side view of the threading mechanism and an upper platform section of the drive body, wherein the threading mechanism is partially broken away to show a base of the cleaning member.

Referring to FIGS. 1 through 3, the threading mechanism 21 includes first and second members, such as first and second links 32 and 33, respectively, that are connected together by a pin 34 such that the links 32 and 33 are moveable with respect to each other. Alternatively, the links 32 and 33 may be connected together by any suitable means. The first link 32 is also pivotally connected to, or otherwise supported by, the second portion 26, such that the first link 32 may pivot about a pivot axis 35 that is coaxially aligned with an axis of the take-up reel 20. For example, the first link 32 may be pivotally connected to an upper platform section 36 of the second portion 26, as shown in FIG. 3 (the upper platform section 36 is not shown in FIGS. 1 and 2).

A drive mechanism 37 is associated with the first link 32 for moving the links 32 and 33 between a tape-unloaded position shown in FIG. 1, and a tape-loaded position shown in FIG. 2. For example, the drive mechanism 37 may include a first gear 38 connected to the first link 32, and a motor 39 having a second gear 40 for driving the first gear 38, such as with a belt 41.

Figure 4:
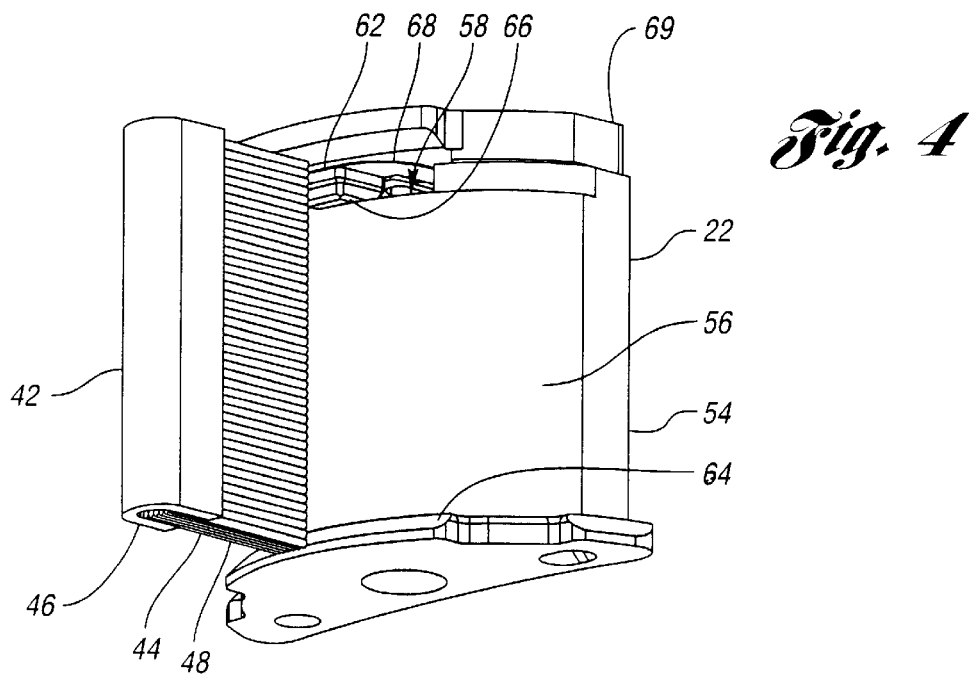
FIG. 4 is a perspective view of the cleaning member engaged with a particular guide bearing, wherein the guide bearing includes first and second guide elements, and a guide body disposed between the guide elements.

Referring to FIGS. 3 and 4, the threading mechanism 21 also includes a cleaning member 42 attached to projection 43 of the first link 32 for cleaning one or more of the guide bearings 22, as explained below in greater detail. While the cleaning member 42 may be any suitable device, such as a pad, the cleaning member 42 is preferably a brush including a bristle portion 44 connected to a base 46. The bristle portion 44 includes a plurality of individually displaceable bristles 48 that extend from the base 46 and are engageable with the guide bearings 22. While the bristles may comprise any suitable material, the bristles preferably comprise natural nylon with no dies or additives.

The base 46 may comprise any suitable material, and is preferably formed around the bristle portion 44. For example, the base 46 may be an aluminum member that is crimped about the bristle portion 44. As another example, the base 46 may comprise a polymer that is molded about the bristle portion 44. Furthermore, the base 46 is attached to the first link 32 in any suitable manner. For example, the base 46 may be snap fit into a recess 50 of projection 43 of first link 32. As another example, the base 46 may be adhesively attached to the projection 43.

The threading mechanism 21 further includes a second leader member, such as a leader pin 52, attached to the second link 33. Furthermore, the leader pin 52 is engageable with the leader block 16.

Figure 5:
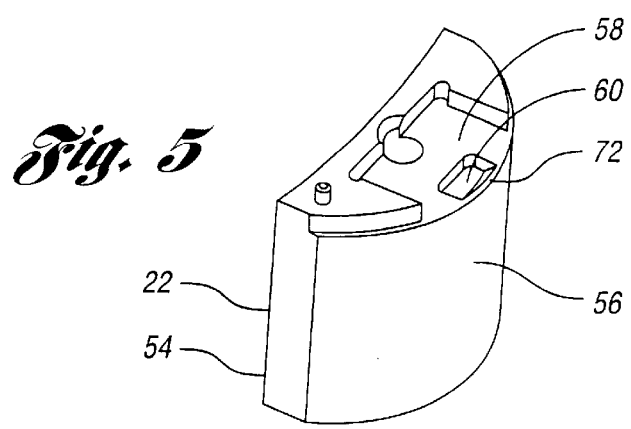
FIG. 5 is a perspective view of the guide body showing a debris pocket formed in a top surface of the guide body.

As shown in FIG. 2, the guide bearings 22 are engageable with the tape 14 and function to guide the tape 14 across the head 24, through the drive body 18 and onto the take-up reel 20. Referring to FIGS. 4 and 5, each guide bearing 22 includes a guide body 54 having a guide surface 56 on which the tape 14 may travel, and a top surface 58 disposed adjacent the guide surface 56. The top surface 58 is preferably provided with a debris pocket 60 for collecting debris, as explained below in greater detail.

Each guide bearing 22 further includes first and second guide elements 62 and 64, respectively, disposed at opposite ends of the guide body 54 such that the guide surface 56 is positioned between the guide elements 62 and 64. The first guide element 62, which may be referred to as a compliant guide button, includes an angled surface or chamfer 66 on each end. The first guide element 62 is also preferably moveably associated with the guide body 54, such that the first guide element 62 can exert a desired load on an edge of the tape 14 as the tape 14 travels over the guide surface 56. For example, the first guide element 62 may be connected to a flexible spring member 68 that is sandwiched between a retainer cap 69 and the guide body 54. Preferably, the first guide element 62 is biased toward the second guide element 64, which is fixed to the guide body 54. With such a configuration, the guide elements 62 and 64 are able to accurately guide the tape 14 over the guide surface 56. Alternatively, both guide elements 62 and 64 may be moveably associated with the guide body 54, or both guide elements 62 and 64 may be fixed to the guide body 54.

As the tape 14 moves through the tape drive 10 and engages the guide bearings 22, however, the tape 14 may wear, which results in tape debris. This debris may accumulate on the guide body 54 and guide elements 62 and 64. Debris that collects between the first guide element 62 and the top surface 58 may also lift the first guide element 62 off the edge of the tape 14, thereby preventing the first guide element 62 from exerting the desired load on the edge of the tape 14. The cleaning member 42 is configured to effectively clean one or more of the guide bearings 22, as explained below in greater detail, so as to remove such debris.

Referring to FIGS. 1 through 5, operation of the tape drive 10 will now be explained. First, the tape cartridge 12 is inserted into the tape drive 10. Next, the tape cartridge 12 moves downwardly so that the leader block 16 engages the leader pin 52. For example, the second portion 26 of the drive body 18 may include a moveable section (not shown) that supports the tape cartridge 12, and is operative to move the tape cartridge 12 upwardly and downwardly.

With the second portion 26 of the drive body 18 in the first position, shown in FIG. 1, the drive mechanism 37 then moves the links 32 and 33 from the tape-unloaded position to the tape-loaded position. As a result, the links 32 and 33 move the leader block 16 along a guide channel 70 and into the guide slot 30.

Advantageously, the cleaning member 42 cleans all of the guide bearings 22 when the links 32 and 33 move between the tape-unloaded position and the tape-loaded position. For example, as the first link 32 pivots with respect to the take-up reel 20, the cleaning member 42 engages each guide bearing 22. More specifically, referring to FIGS. 4 and 5, the cleaning member 42 engages the guide surface 56 and guide elements 62 and 64 of each guide bearing 22, thereby effectively removing accumulated debris. Furthermore, as the cleaning member 42 moves across a particular guide bearing 22, the chamfer 66 of the respective first guide element 62 directs bristles between the first guide element 62 and the respective guide body 54, thereby facilitating removal of debris. Preferably, but not necessarily, the bristle portion 44 has a height at least as great as the height of the guide body 54 and guide elements 62 and 64.

In addition, each debris pocket 60 may help to reduce displacement of a respective first guide element 62 caused by accumulated debris. For example, each debris pocket 60 is located sufficiently close to a respective guide surface 56, such that debris which collects between a respective first guide element 62 and a respective guide body 54 will fall into the debris pocket 60, rather than displacing the first guide element 62. Preferably, each debris pocket 60 is located immediately adjacent a respective guide surface 56. In the embodiment shown in FIG. 5, a narrow land 72 exists between the debris pocket 60 and the guide surface 56. The land 72 is sufficiently narrow so as to inhibit accumulation of debris between the land 72 and the first guide element 62. For example, the land 72 may have a width in the range of 0 to 0.5 millimeters.

After the leader block 16 has been loaded into the guide slot 30, the second portion 26 of the drive body 18 moves to the second position shown in FIG. 2. When the second portion 26 is in the second position, the head 24 is able to perform read/write operations on the tape 14 as the tape 14 moves through the tape drive 10.

Because the cleaning member 42 effectively and efficiently removes debris from the guide bearings 22, the guide bearings 22 are able to accurately guide the tape 14 through the tape drive 10. Advantageously, the cleaning member 42 may clean the guide bearings 22 when the links 32 and 33 move from the tape-unloaded position to the tape-loaded position, and also when the links 32 and 33 move from the tape-loaded position back to the tape-unloaded position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A tape drive comprising:
   a drive body;
   a tape guide supported by the drive body; and
   a threading mechanism having a first member pivotally associated with the drive body, and a cleaning member supported by the first member and moveable therewith, wherein the cleaning member is engageable with the tape guide so as to clean the tape guide.

2. The tape drive of claim 1 wherein the cleaning member is a brush having a plurality of bristles, and wherein the tape guide includes a guide body and a guide element adjacent the guide body, the guide element having an angled surface for directing bristles between the guide body and the guide element.

3. The tape drive of claim 2 wherein the guide element is moveable with respect to the guide body.

4. The tape drive of claim 1 wherein the cleaning member is a pad.

5. The tape drive of claim 1 wherein the tape guide has first and second guide elements and a guide surface disposed between the guide elements, and wherein the cleaning member is engageable with the guide elements and the guide surface.

6. The tape drive of claim 1 wherein the tape guide includes a debris pocket for collecting debris.

7. The tape drive of claim 6 wherein the tape guide includes a guide surface and a top surface adjacent the guide surface, wherein the pocket is formed in the top surface.

8. The tape drive of claim 7 wherein the top surface defines a narrow land disposed between the pocket and the guide surface.

9. The tape drive of claim 1 wherein the cleaning member is fixedly secured to the first member.

10. A tape drive for use with a tape cartridge including a length of tape and a leader member attached to the tape, the tape drive comprising:
    a take-up reel;
    a tape guide adapted to engage the tape so as to guide the tape; and
    a threading mechanism adapted to engage the leader member and being moveable between a tape-unloaded position and a tape-loaded position so as to load the leader member onto the take-up reel, the threading mechanism including a cleaning member that is engageable with the tape guide so as to clean the tape guide when the threading mechanism moves between the tape-unloaded position and the tape-loaded position.

11. A tape drive for use with a tape cartridge including a length of tape and a first leader member attached to the tape, the tape drive comprising:
    a drive body;
    a tape guide supported by the drive body, the tape guide having first and second guide elements and a guide body disposed between the guide elements, the first guide element having an angled surface disposed adjacent the guide body, the guide body having a guide surface on which the tape may travel, and a top surface adjacent the guide surface, the top surface defining a debris pocket for collecting debris; and
    a threading mechanism moveable between a tape-unloaded position and a tape-loaded position, the threading mechanism including a first link pivotally associated with the drive body, a second link moveably associated with the first link, a cleaning brush fixedly secured to the first link and having a plurality of bristles engageable with the tape guide so as to clean the tape guide, and a second leader member attached to the second link and adapted to engage the first leader member, wherein when the threading mechanism moves between the tape-unloaded position and the tape-loaded position, the cleaning brush engages the tape guide, and the angled surface directs some of the bristles between the first guide element and the guide body.

12. A method for cleaning a tape guide of a tape drive, wherein the tape drive includes a threading mechanism for loading tape into the tape drive, the method comprising:
    providing a cleaning member on the threading mechanism; and
    moving the threading mechanism so as to move the cleaning member across the tape guide.

13. The method of claim 12 wherein the cleaning member is a brush having a plurality of bristles, and the tape guide has a guide body on which tape may travel, and a guide element disposed adjacent the guide body, and wherein the step of moving the threading mechanism comprises moving the threading mechanism such that bristles of the brush are directed between the guide body and the guide element.

* * * * *